(12) United States Patent
Lintonen et al.

(10) Patent No.: US 11,441,845 B2
(45) Date of Patent: Sep. 13, 2022

(54) STOVE GUARD USING A BROAD FIELD OF VIEW

(71) Applicant: Safera Oy, Espoo (FI)

(72) Inventors: Samuli Lintonen, Vantaa (FI); Hans Von Bagh, Porvoo (FI)

(73) Assignee: SAFERA OY, Espoo (FI)

( * ) Notice: Subject to any disclaimer, the term of this patent is extended or adjusted under 35 U.S.C. 154(b) by 126 days.

(21) Appl. No.: 16/243,630

(22) Filed: Jan. 9, 2019

(65) Prior Publication Data

US 2019/0212060 A1 Jul. 11, 2019

(30) Foreign Application Priority Data

Jan. 9, 2018 (FI) ...................................... 20185023

(51) Int. Cl.
*F27D 21/04* (2006.01)
*G01J 5/08* (2022.01)
(Continued)

(52) U.S. Cl.
CPC .............. *F27D 21/04* (2013.01); *A62C 3/006* (2013.01); *F24C 7/082* (2013.01); *F24C 7/083* (2013.01); *F24C 15/2021* (2013.01); *F27D 21/0014* (2013.01); *F27D 21/02* (2013.01); *G01J 5/0044* (2013.01); *G01J 5/07* (2022.01); *G01J 5/08* (2013.01); *G01J 5/0846* (2013.01);
(Continued)

(58) Field of Classification Search
CPC ...... F27D 21/04; F27D 21/0014; F27D 21/02; F27D 2021/0057; A62C 3/006; F24C 7/082; F24C 7/083; F24C 15/2021; G01J 5/0044; G01J 5/08; G01J 5/0846; G01J 5/089; G01J 5/0896; G08B 21/182
See application file for complete search history.

(56) References Cited

U.S. PATENT DOCUMENTS 3,415,994 A * 12/1968 Fitti, Jr. ................ G01J 5/0831
250/349
5,296,707 A * 3/1994 Nozu ................... G08B 13/193
250/342
(Continued)

FOREIGN PATENT DOCUMENTS

CN 205065848 U 3/2016
DE 102008041390 A1 2/2010
(Continued)

OTHER PUBLICATIONS

European Search Report for Application No. 19150656.7, dated May 15, 2019, 9 pages.
(Continued)

*Primary Examiner* — Kerri L Mcnally
(74) *Attorney, Agent, or Firm* — Brooks Kushman P.C.

(57) ABSTRACT

A stove guard having a data processing unit and a heat sensor arrangement for receiving heat radiation from objects located in a given field of view and for delivering the detector signals indicative of the received heat radiation to the data processing unit. The heat sensor arrangement is arranged to generate detector signals differently corresponding to the heat radiation received from a central area of the field of view than to the heat radiation received from a circumferential area of the field of view.

9 Claims, 2 Drawing Sheets

(51) Int. Cl.
*F24C 7/08* (2006.01)
*G01J 5/07* (2022.01)
*A62C 3/00* (2006.01)
*F24C 15/20* (2006.01)
*F27D 21/00* (2006.01)
*F27D 21/02* (2006.01)
*G01J 5/00* (2022.01)
*G08B 21/18* (2006.01)

(52) U.S. Cl.
CPC .......... G01J 5/0896 (2013.01); G08B 21/182 (2013.01); *F27D 2021/0057* (2013.01)

(56) References Cited

U.S. PATENT DOCUMENTS

| | | | | |
|---|---|---|---|---|
| 6,585,409 | B2* | 7/2003 | Schmidt | G01J 5/08 |
| | | | | 250/491.1 |
| 2005/0211903 | A1* | 9/2005 | Harter | B60Q 9/008 |
| | | | | 250/353 |
| 2005/0265423 | A1* | 12/2005 | Mahowald | H05B 6/687 |
| | | | | 374/121 |
| 2009/0242769 | A1* | 10/2009 | Luterotti | G01J 5/0022 |
| | | | | 250/339.02 |
| 2010/0040109 | A1* | 2/2010 | Schreher | G01J 5/0846 |
| | | | | 374/124 |
| 2010/0181302 | A1* | 7/2010 | Ernst | H05B 6/062 |
| | | | | 219/622 |
| 2010/0254570 | A1* | 10/2010 | De Coi | H04Q 9/00 |
| | | | | 382/100 |
| 2012/0170612 | A1 | 7/2012 | Pompei | |
| 2013/0255661 | A1 | 10/2013 | Yamanaka et al. | |
| 2015/0116107 | A1* | 4/2015 | Fadell | G08B 19/005 |
| | | | | 340/501 |
| 2019/0019388 | A1* | 1/2019 | Garg | G01J 5/00 |

FOREIGN PATENT DOCUMENTS

| | | |
|---|---|---|
| DE | 102011081355 A1 | 2/2013 |
| EP | 0326942 A2 | 8/1989 |
| EP | 2154500 A2 | 2/2010 |
| EP | 2562480 A1 | 2/2013 |
| EP | 3144908 A2 | 3/2017 |
| GB | 2468398 A | 9/2010 |
| JP | 2014115914 A  * | 6/2014 |
| WO | 03074940 A1 | 9/2003 |
| WO | 2010000947 A2 | 1/2010 |
| WO | 2016148645 A1 | 9/2016 |

OTHER PUBLICATIONS

FI Search Report for 20185023, Completed by the Finish Patent Office dated Jun. 6, 2018, 2 Pages.

* cited by examiner

STOVE GUARD USING A BROAD FIELD OF VIEW

CROSS-REFERENCE TO RELATED APPLICATION

This application claims foreign priority benefits under 35 U.S.C. § 119(a)-(d) to FI Application Serial No. 20185023 filed Jan. 9, 2018, the disclosure of which is hereby incorporated in its entirety by reference herein.

TECHNICAL FIELD

This invention relates to stove guards for improving the safety of a stove. In particular, the invention relates to the width f the field of view of the sensor in a stove guard and to making use of a broad field of view.

BACKGROUND

The key factor in the operation of a stove guard is an infrared or heat radiation sensor which has a specific field of view and receives heat radiation emitted by objects in the field of view. It is also possible to have several sensors in one stove guard whereby the entire field of view of the stove guard is formed as a combination of the fields of view of the sensors. If the stove guard receives from the objects in the field of view a quantity of heat radiation which exceeds a predetermined limit value, the control electronics of the stove guard may give an alarm, turn off the stove and/or take other emergency management measures. Prior art relating to stove guards has been discussed for example in the International Patent Application Publication Number WO 2010/000947 A2.

In order to function efficiently the stove guard must have a field of view which covers the entire area of the stove. One stove guard according to the aforementioned prior art was designed to be installed in a cooker hood or an extractor fan, above a standard sized, typically 50-60 cm wide stove. In this case, the geometry of the installation is repeated quite similarly from one installation to another and the field of view of the stove guard does not have to be very wide. However, there are trends in the development of kitchens, which often make older stove guards unsuitable for use. Consumers are acquiring large stoves more than before, even larger than 90 centimeters in width, in which case the field of view of the stove guard has to be correspondingly broader. The extractor fan may possibly be located behind the stove and be integrated into the worktop so that a top-down oriented stove guard might not find a natural installation place elsewhere than in the kitchen ceiling. Although a greater height from the stove could itself mean need for a narrower field of view, correct alignment may become a problem. If the stove guard installed in the ceiling is directed even slightly wrong, its field of view may not cover the entire area of the stove, at least uniformly. Therefore, a greater mounting height may have certain requirements as regards the width of the field of view.

However, the width of the field of view and the varying installation height of the stove guard in different kitchen solutions cause their own problems. The wider the field of view of a particular sensor, the greater the differences in the arrival angle of the heat radiation from different parts of the field of view. The flux of the heat radiation also attenuates proportionally to the square of the distance. Both of these factors reduce the certainty of the detections. Stove guard being a safety device, its operation should be made as secure and reliable as possible.

SUMMARY

It is an object of the invention to provide a stove guard capable of detecting exceptional and hazardous situations reliably and safely regardless of the fact that the mounting geometry thereof may vary. It is also an object of the invention to provide a stove guard which provides versatile functions as regards its sensor arrangement and data processing capability. It is also an object of the invention to provide a stove guard which, despite of its versatility and reliability, is inexpensive to manufacture. In addition, it is an object of the invention that the user can control the stove guard described above by gestures.

The objects of the invention are achieved by dividing the field of view of the heat sensor arrangement of the stove guard into zones so that different detector signals are generated from at least the central area of the field of view than from the circumferential area thereof. For achieving objects of the invention, it may also be useful to have an optical transmitter emitting a radiation, the reflection of which the stove guard is able to measure. Moreover, for achieving certain objects of the invention it is useful to have a humidity sensor. For achieving some of the objects of the invention it may also be useful to provide the heat sensor arrangement of the stove guard with two or more detectors, having sensitivity bands positioned differently on the heat radiation wavelength axis.

The stove guard according to the invention is characterized by what is presented in the characterizing part of the appended independent claim relating to the stove guard. Preferred embodiments and further features of the invention are set forth in the dependent claims.

In this text, the term heat sensor arrangement refers to the part or the parts of the stove guard which directly relate to reception of heat radiation from objects located in a given field of view and to generation of detector signals indicative of the received heat radiation. The heat sensor arrangement may have one or more actual detector elements, and the heat radiation directed towards them may be controlled and modified by various optical elements such as apertures, collimators, lenses, reflectors, diffractors, shutters, visors, baffles, shades, frames, and/or filters for example. The concept "optical element" is here interpreted to mean any technical means that affect the way in which heat radiation may reach a detector element. When the field of view of the heat sensor arrangement is divided into zones and the detector signals are generated differently corresponding to the heat radiation received from the central area of the field of view than to the heat radiation received from the circumferential area of the field of view, the usability of the stove guard is not dependent on the mounting geometry as strongly as with prior art stove guards. If the detector elements are optimized for different wavelength ranges, it is possible to make more versatile and reliable conclusions from the signals they provide than if they were used to detect only one wavelength band.

One alternative for dividing the field of view into zones is a lens specifically suitable for heat radiation, positioned on the optical path between the objects in the field of view and the detector element of the heat sensor arrangement, and causing an attenuation to the heat radiation which is dependent on the arrival angle of the heat radiation. The lens can be used to attenuate the heat radiation received from the central area of the field of view more than the radiation received from the circumferential area of the field of view. In this case, the field of view can be made relatively broad, because even though the heat radiation received from the periphery of the field of view was received at a more slant angle and it had to travel a longer distance in the medium compared to the heat radiation received from the central area of the field of view, the attenuating properties of the lens smooth out the differences between the zones of the field of view.

Another alternative is to use two different detector elements, possibly together with optical element(s), which direct(s) to the first detector element heat radiation from a narrower portion of the field of view than to the second detector element. Such an arrangement has the particular advantage that the measurement signals generated by the different detector elements may be compared to each other for determining whether the temperatures they measure are different. The stove guard can alert if only one of the detector elements measures a very high temperature, because this means that there is one extremely hot spot in the field of view instead of evenly distributed heat sources throughout the area.

If the stove guard has an optical transmitter emitting an optical radiation the reflection of which can be measured, the functional possibilities are even more diversified. Different objects move in very different ways and this can be detected in the reflections: for example, the user's hand which is used for making a guiding gesture, produces a rather regularly and slowly changing reflection compared to the reflection generated by smoke or steam, which changes rapidly and irregularly. If the stove guard also has a humidity sensor, it is possible to distinguish whether the quickly and irregularly changing reflection was caused by smoke or steam.

If the stove guard has a proximity sensor, the object data provided by it, corresponding to the proximity of an external object, may be combined with other information to make more accurate conclusions. The stove guard may for example identify whether the detected change in the reflected radiation occurs simultaneously with the measured proximity of an external object. If only the reflection changes but at the same time there is no observation of the proximity of an external object (such as user's hand), the stove guard can alert, because there is probably smoke or steam in the field of view.

The advantages and possibilities of application of the invention will become more fully apparent from the detailed description of the embodiments and the accompanying drawings.

DETAILED DESCRIPTION

Figure 1:
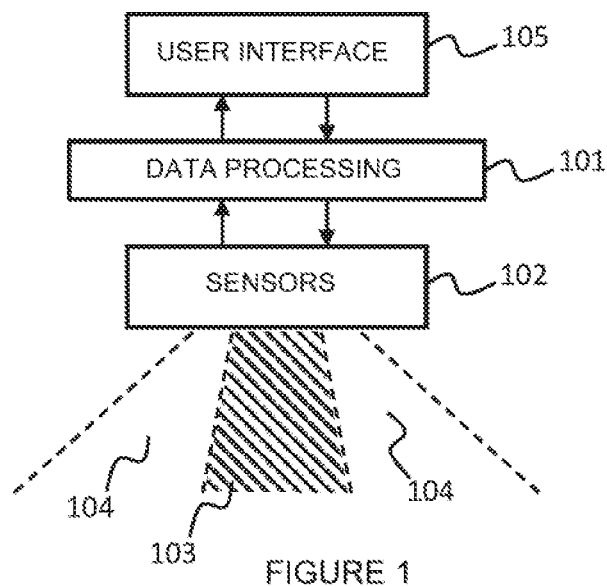
FIG. 1 shows a stove guard in which the field of view of the heat sensor arrangement is divided into zones FIG. 2 selectively shows the use of an attenuating lens on the optical path

FIG. 1 is a coarse-level block diagram of a stove guard which has a data processing unit 101 and a heat sensor arrangement 102. The data processing unit 101 may be a single processor or a microcontroller, or it may consist of a combination of several different processor circuits and additional components necessary for their operation. In the block diagram of FIG. 1, the memory and other conventional functions of the programmable devices are located in the data processing unit 101 without describing them in more detail.

The purpose of the heat sensor arrangement 102 is to receive heat radiation from objects in a given field of view and to deliver detector signals indicative of the received heat radiation to the data processing unit 101. The field of view is illustrated by dashed lines in FIG. 1. In particular the heat sensor arrangement 102 is arranged to generate detector signals differently corresponding to the heat radiation received from the central area of the field of view (shaded area 103) than to the heat radiation received from the circumferential area of the field of view 104.

Although the response of the heat sensor arrangement 102 to the heat radiation received from different parts of the field of view is different, it is not a so-called imaging sensor in the sense that it would be possible to generate from the detector signals it produces a thermal image of the area in the field of view. There are infrared or imaging sensors, i.e. thermal cameras, operating in heat radiation range, but their technology is far too expensive and complicated at the time of writing this text to be used in a consumer product such as a stove guard whose manufacturing cost and selling price must be kept low. In the following are described some examples of how it is possible, using very simple detector elements, to assemble a heat sensor arrangement which has the advantageous feature described above.

The stove guard has also a user interface 105 which, in the block diagram such as the one shown in FIG. 1, contains all the elements through which the stove guard receives control commands from the user and provides the user with information about its operation. A simple user interface may include only one or several buttons, and one or more indicator lights and/or audible indication devices. The user interface 105 may include, for example, light and/or audible indicator devices through which the data processing unit 101 may alert the user. A more versatile user interface may include for example a display which may be a touch screen, and/or speech recognition and speech synthesis features. In the arrangement shown in FIG. 1, the user interface 105 is also considered to include controllable relays and corresponding devices by the intermediary of which the stove guard can automatically switch off stove functions.

As regards its mechanics, the user interface 105 may be part of the same device, which also includes the data processing unit 101 and the heat sensor arrangement 102, or may be located in a separate device. The latter solution is useful, for example, in installations where the heat sensor arrangement 102 must be placed in a location where the user has difficulties to see it and/or access it during normal operation. In this case, the user interface 105 may be placed in a more convenient location and the necessary data exchange connections between it and the other device can be managed, for example, by wires or short-range wireless connection, for example via Bluetooth or Zigbee connection or the like. Yet another embodiment is one in which, in addition to or instead of a user interface in the stove guard device itself, a wireless connection is used with a user terminal such as a smartphone or tablet, whereby the user interface is implemented as a programmed process performed by the terminal.

It is typical for all electrical devices that the operating voltages they require must be brought from somewhere and converted to a form which is suitable for the components of the device. Since these functions can be implemented in any way in the embodiments of the present invention and there is no inventiveness therein, there is no need to explain them more closely herein.

Figure 2:
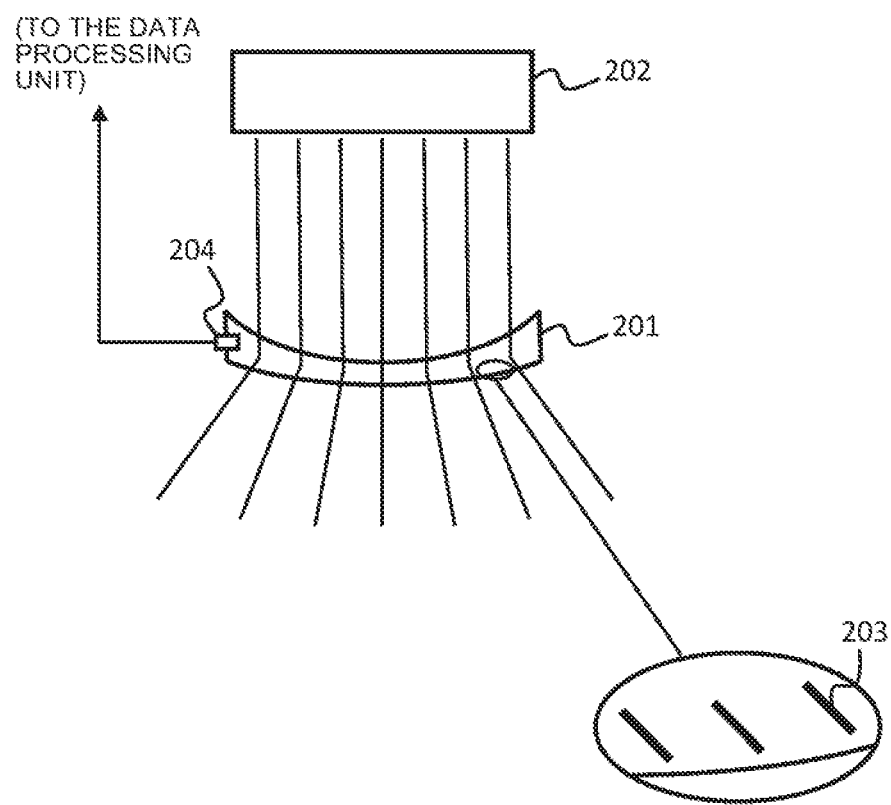

FIG. 2 illustrates one alternative for arranging the heat sensor arrangement to generate detector signals differently corresponding to the heat radiation received from the central area of the field of view than to the heat radiation received from the circumferential area of the field of view. The stove guard, of which some details are shown in FIG. 2, has a lens 201 disposed on the optical path between objects located in the field of view of the heat sensor arrangement and the detector element 202 of the heat sensor arrangement. The attenuation caused by the lens 201 to the heat radiation is dependent on the arrival angle of the heat radiation which may be determined, for example, as the angle between the optical axis and the arrival direction of the heat radiation. In FIG. 2, the optical axis of the arrangement is a vertical line. Optical path means the portion of the space through which heat radiation must travel in order to move from objects present in the field of view to the detector element of the heat sensor arrangement, or to one of them, if there are several detector elements.

The lens 201 is of course made of a material that is well permeable to heat radiation in the desired wavelength range and has a refractive index sufficient to provide controlled heat radiation through the lens in the desired direction. The lens 201 may, for example, be polyethylene and made by injection molding.

The angle-dependent attenuation of the heat radiation may be implemented in a variety of ways, one of which is illustrated in the partial magnification shown in the lower right part of FIG. 2. It has a so-called screen structure formed inside the lens 201, consisting of a plurality of strips, which are impregnated in the lens material and are poorly permeable to heat radiation. The strips appear as lines 203 in the partial magnification, which is a cross-section of a portion of the lens 201 surface. Heat radiation, the travel of which is illustrated by broken lines in FIG. 2, can easily propagate between the screen structure, provided it has a relatively large arrival angle. A portion of the heat radiation propagating in the direction of the optical axis is absorbed by the screen structure. Thus, a relatively smaller portion of the heat radiation received from the central area of the field of view reaches the detector 202, whereby as a whole the heat sensor arrangement is arranged to generate detector signals differently corresponding to the heat radiation received from the central area of the field of view than to the heat radiation received from the circumferential area of the field of view.

Absorbent and/or reflective structures the effect of which depends on the arrival angle of the heat radiation may also be formed on one of the lens 201 surfaces or even on both surfaces. Their scale can be macroscopic, i.e. large in relation to the wavelength of the heat radiation, or the structures may be made on a scale that is significant in terms of the heat radiation wavelength, so that the interaction mechanism with the heat radiation is diffractive. In addition to or in place of the lens or lenses, mirrors reflecting heat radiation and/or other optical elements known per se may also be used. The present invention does not as such impose any limitations on the technique used to provide the angle-dependent attenuation and/or reflection of the heat radiation.

The lens 201 may be a conventional lens or a Fresnel lens, which refers, in a known manner, to a lens having one or more optically functional surfaces divided into a plurality of, typically annular, concentric frames. Fresnel lenses are typically much thinner and lighter than conventional lenses having similar refracting properties, which is particularly advantageous in a device like a stove guard, the external dimensions and weight of which are preferably kept low.

Heat radiation absorbed by the lens 201 changes the lens's own temperature, and the lens emits heat radiation like any other object or substance of specific temperature. This can cause error when trying to detect the temperature of actual objects in the field of view, especially when the temperature of the lens changes at different rate compared to the temperature of the objects being measured. FIG. 2 shows schematically an arrangement for preventing the error. A temperature sensor 204, placed in the lens 201 or its immediate vicinity, delivers a measurement result indicating the lens temperature. The data processing unit into which the signals generated by the temperature sensor 204 are conducted may be programmed to make a correction to the measurement results, which depends on the measured temperature of the lens (or other objects on the optical path) and its recent development. There may also be several sensors.

Figure 3:
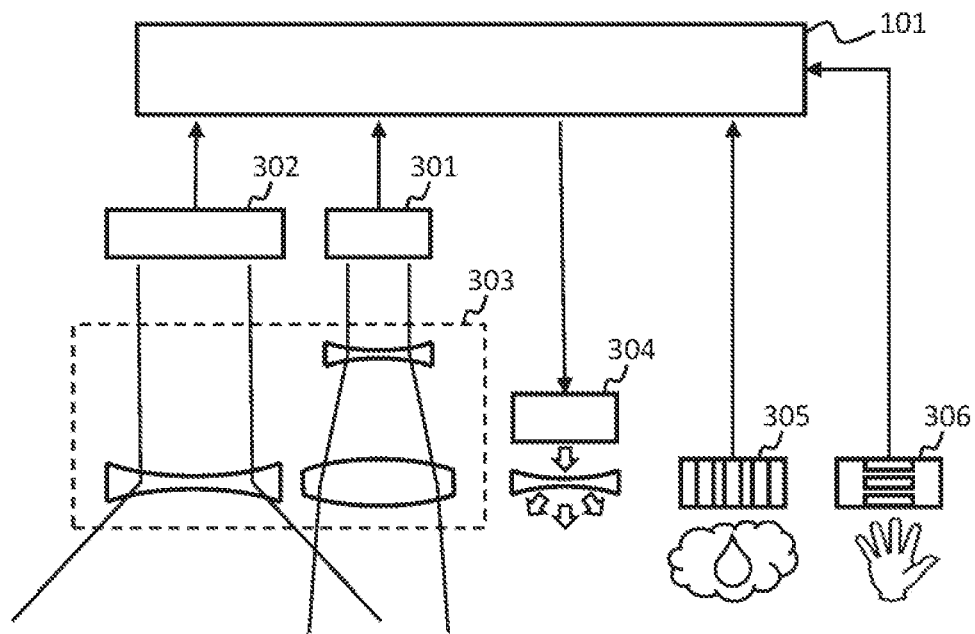
FIG. 3 shows a stove guard which has a diverse sensor arrangement.

FIG. 3 schematically illustrates sensor and data processing portions of a stove guard. The stove guard has a data processing unit 101 and the heat sensor arrangement thereof includes a first detector element 301 and a second detector element 302. It also has one or more optical elements which are generally indicated by reference numeral 303 in FIG. 3 and are arranged to direct heat radiation to the first detector element 301 from a narrower portion of the field of view than to the second detector element 302. In the exemplary embodiment of FIG. 3, the heat radiation is directed to the first detector element 301 through a relatively directional lens arrangement and to the second detector element 302 through a wider range arrangement, whereby the field of view of the first detector element 301 forms a relatively narrow beam. It is advantageously positioned in the central area of the total field of view of the heat sensor arrangement. It would also be possible, using a suitable and properly delimited shade or baffle, to exclude from the field of view of the second detector element 302 the portion which is covered by the field of view of the first detector element 301. Thus, the fields of view of the individual detector elements would be tangent to each other but would not overlap.

Conventional detector elements used for detecting heat radiation are based on detection of the total amount of heat radiation of a given frequency or wavelength range (e.g., wavelengths of 4 to 16 micrometers) at a given spatial angle. If the detector signals generated by the second detector element 302 were considered alone, it could be possible that a single very hot object, such as a stove which has been left on, would generate similar detector signal as a plurality of moderately warm objects in a wider area. In other words, a stove guard might not necessarily be able to reliably distinguish an incident (one overheated cooking plate) from a normal situation (when food is cooked on several cooking plates).

In the stove guard according to FIG. 3 the data processing unit 101 may be programmed to compare the detector signals generated by the first detector element 301 and the second detector element 302 to determine whether the temperature measured by the first detector element 301 is different from that measured by the second detector element 302. If the temperatures measured by the detector elements 301 and 302 show a significant difference, and if moreover the temperature of the object measured by either one of the detector elements is higher than a predetermined threshold value, it is likely that there is a hot object in the field of view which is so small that it falls in the field of view of only one of the detector elements. The data processing unit 101 may be programmed to generate an alarm in response to such an observation. As an addition to or alternative of comparing a measured temperature to a predetermined threshold value the processing unit 101 may apply a more elaborate deduction algorithm that takes into account not only the actual, measured temperature value but its previous development and/or relation to other measured quantities. In such a case the decision criterion "is higher than a predetermined threshold value" should be understood more generally, so that the result of the deduction process is beyond some decision-making limit that signifies the borderline between normal and anomalous incidents at or close to the stove.

In other words, simple comparison of the object's measured temperature to a limit value is often an inadequate method for reliably identifying exceptional situations and incidents. This is presented herein as a simplified example of a condition, the fulfillment of which causes the data processing unit 101 to generate an alarm. In practice, the data processing unit 101 is generally programmed to perform rather complex algorithms which not only take into account the instantaneous value of the detector signals, but also the recent change history of the values and/or longer-term trends. It is not of particular importance for the present invention, which type of reasoning algorithm the data processing unit 101 is programmed to execute. It is more essential that, by means of a suitable heat sensor arrangement, it is possible to produce detector signals to be used by these algorithms which have not been available in the prior art stove guards.

One function that would be very useful in a stove guard would be detection of smoke and steam, and most preferably distinction between smoke and steam observations. In accordance with the established practice, steam refers in this text to both vapor itself and to fog which condensates from vapor and is visible also to human eye. The ability to detect smoke would be particularly useful for example in a situation where food contained in a lidded kettle burns and begins to smoke. Because of the lid, the radiation and the convection heat may not necessarily be so strong that the incidence is detected by heat sensors fast enough. The ionic and optical detectors used in conventional smoke detectors are based on the fact that when the concentration of flue gas in a given chamber increases, the characteristics of the chamber (electrical current permeability, optical scattering) change. Chamber-based detectors are poorly suited for appliances like stove guards, because in the vicinity of the stove, the measuring chamber with its components would quickly accumulate fat and other dirt and the cleaning thereof would not be very easy to arrange.

According to one embodiment of the present invention, the detection of smoke and steam in the stove guard may be based on detection of optical radiation reflected and/or scattered outside the stove guard. The stove guard may have an optical transmitter emitting optical radiation which may be detected by the stove guard's own detectors designed for detecting optical radiation. If there is only pure air on the path of the optical radiation, the signal generated by the detectors is different than if the optical radiation on its way would encounter steam, smoke or, for example, the user's hand, which is used to make a gesture for controlling the operation of the stove guard. Indeed, it is possible to combine the detection of smoke and steam as shown herein with a gesture control so that same components are used at least partially for these two purposes.

The stove guard according to FIG. 3 has an optical transmitter 304 arranged to transmit optical radiation. According to the established practice, optical radiation means ultraviolet, visible light, or infrared radiation. Suitable radiation wavelength must be selected so that it encounters significant reflection and/or scattering at smoke and steam concentrations typically found in the environment of a conventional stove. In addition, the wavelength must be selected so that reflection and/or scattering of the radiation can be measured with stove guard's own detectors. It is of course possible to provide the stove guard with at least one detector designed to measure only the optical radiation emitted by the optical transmitter, but as regards manufacturing costs, reliability, external dimensions and energy consumption, it is preferable that same detectors can be used for multiple purposes. There may be more than one optical transmitter in which case they may operate at same or different wavelengths.

In the smoke guard according to FIG. 3, the optical transmitter 304 is arranged to transmit optical radiation to the field of view from which the detector elements 301 and 302 of the heat sensor arrangement receive heat radiation. Thus, the optical transmitter 304 is most preferably an infrared transmitter, and the heat sensor arrangement is also arranged to receive from the field of view radiation emitted by said optical transmitter and reflected or scattered from an object in the field of view. If the user puts his/her hand or any hand-held object in the field of view and makes a guiding gesture with it, the hand or object reflects the radiation emitted by the optical transmitter 304 in a specific way. Correspondingly, if there is steam or smoke in the field of view, it will reflect or scatter the radiation emitted by the optical transmitter 304 in another specific way.

It has been observed by measurements that movement of the user's hand in the field of view causes a relatively slow and regular change in the reflected radiation (and which is thus received by the heat sensor arrangement), whereas smoke or steam present in the field of view causes rapid and irregular changes. The data processing unit 101 may be programmed to identify whether the received radiation, emitted by the optical transmitter and reflected or scattered from an object in the field of view, changes regularly or irregularly. In the first case, the data processing unit 101 may perform a function which is aimed by the guiding gesture, such as, for example, acknowledging a specific, previously issued alarm. In the latter case in turn, the data processing unit 101 may give an alarm indicating that smoke or steam has been detected in the area of the stove.

Although smoke and steam may reflect or scatter optical radiation somewhat similarly, they have one significant difference. Steam can be detected by a humidity sensor, while smoke does not produce humidity detection in significant amounts. In order to the stove guard according to FIG. 3 to detect this difference, it has a humidity sensor 305 arranged to measure air humidity and to deliver measuring data corresponding to the measured air humidity to the data processing unit 101. The data processing unit 101 is programmed to identify whether the detected irregular change in radiation emitted by the optical transmitter 304 and reflected from an object in the field of view occurs simultaneously with measured rapid changes in air humidity. The data processing unit 101 is programmed to give a smoke alarm in response to an observation according to which the identified, irregular change in radiation emitted by the optical transmitter and reflected from an object in the field of view does not occur simultaneously with measured rapid changes in air humidity, because it is likely smoke which is observed at that moment.

In addition, the stove guard according to FIG. 3 has a proximity sensor 306 arranged to measure proximity of an external object and to deliver object information corresponding to the measured proximity of the external object to the data processing unit 101. The proximity sensor 306 may, for example, be a capacitive sensor known per se, which provides object information, for example, when the user moves his/her hand close enough to the stove guard. By using the proximity sensor 306 it is possible to further diversify the signal variety upon which the data processing unit 101 is based, for determining the activities in the stove area at any given time. The data processing unit 101 is programmed to identify whether the detected change in radiation emitted by the optical transmitter 304 and reflected from an object in the field of view occurs simultaneously with the measured proximity of an external object. If yes, the change in reflected radiation was probably caused by the user's hand, which he/she brought into the field of view near the stove guard. The data processing unit 101 may be programmed to give an alarm in response to an observation according to which the identified change in radiation emitted by the optical transmitter 304 and reflected from an object in the field of view does not occur simultaneously with the measured proximity of an external object, since at that moment the change could have been caused by smoke, steam, an unexperienced user, a domestic animal, or appearance in the field of view of another object which should not be there.

In addition to, or in place of gesture control, which receives as input data measured reflections of the optical radiation and/or proximity data measured by the proximity sensor 306, it is possible to use voice control. A simple voice control may be based on a microphone present in the stove guard, delivering a signal from which is examined only if the microphone received an abnormal sound that occurred simultaneously with a specific reflection of the optical radiation or with a specific observation obtained with the proximity sensor. With such comparison it would be possible for example to make a distinction between an alarm made intentionally by the user (for example: hand movement in the field of view of the stove guard and the word "off" said simultaneously) and an unintentional hand movement above the stove. A more sophisticated voice control may have features of speech recognition, whereby the stove reacts differently depending on what the user or another person in the room has said. The microphone and the optional speech recognition unit may be located in the stove guard itself or may be part of a general smart home user interface programmed to transmit the voice commands relating to the stove guard or their equivalent electronic commands to the stove guard. At the time of writing this text, well-known smart home audio control interfaces which could be used to build a connection to the stove guard, are Google Home and Amazon Alexa among others.

Figure 4:
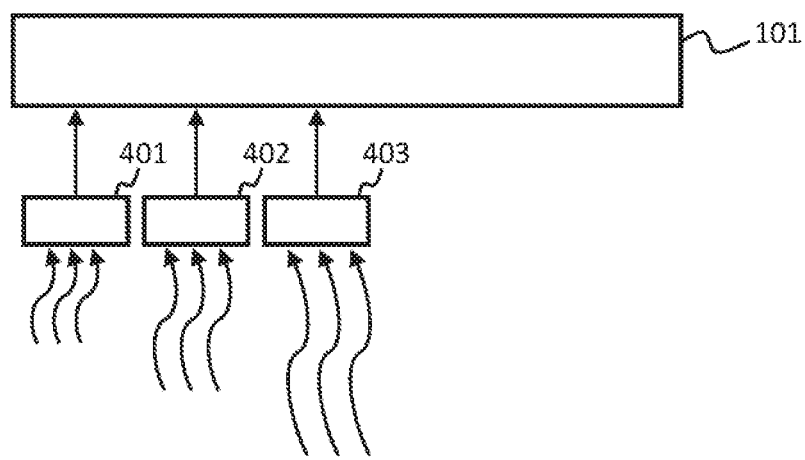
FIG. 4 shows the principle of a stove guard which separates the different wavelengths.

If the detector or the detectors of the heat sensor arrangement have a wide bandwidth, they mainly detect the total amount of the received heat radiation, rather than the shape of its spectrum, i.e. the relative distribution of radiation energy at different wavelengths. FIG. 4 shows the principle of a stove guard provided with a heat sensor arrangement with two or more detector elements 401, 402 and 403, having sensitivity bands positioned at different parts of the heat radiation wavelength axis. One way of positioning the sensitivity bands of the different detector elements at different points on the heat radiation wavelength axis is to use detector elements based on different detector technology. The detector element 403 with the longest wavelength is for example a thermopile sensor provided with a suitable filter having a sensitivity band of about 3-16 micrometers. The medium wavelength detector element 402 is for example an InGaAs receiver provided with a suitable lens having a sensitivity band of about 1-3 micrometers. The detector element 401 with the shortest wavelength is for example an infrared photodiode having a sensitivity band of about 700-1000 nanometers.

The sensitivity bands of the various detector elements may be positioned on the heat radiation wavelength axis at completely different parts, as in the example described above (3-16 micrometers, 1-3 micrometers, 700-1000 nanometers). Another option is that the sensitivity bands of at least two detector elements are positioned at least partially overlapping on the heat radiation wavelength axis. For example, they may overlap in the region of their separating wavelength (e.g., 2-16 micrometers and 1-3 micrometers) or one of them may cover a narrower portion of the other's sensitivity band (e.g., 3-16 micrometers and 6-10 micrometers).

In the stove guard of FIG. 4, the data processing unit 101 may be programmed to compare the detector signals generated by the different detector elements 401, 402 and 403 in order to determine the temperature of the object in the field of view and other object information. For example, the data processing unit 101 may observe the absolute magnitude and rate of change of the detector signal generated by each detector element. If there is a small object in the field of view, the temperature of which rises rapidly, the detector signal generated by the shortest wavelength detector element 401 can be assumed to change faster than the detector signals originating from the other detector elements 402 and 403.

The above described features of the stove guard can be varied and combined in many different ways. For example, FIG. 3 shows that all detector types would be in use in the same stove guard. However, depending on the intended use and the desired functionality, it is possible to select for the stove guard only some of the detector types shown in FIG. 3 and/or additionally to provide the stove guard with any of the detector types not discussed in detail in this specification.

Another variant option relates to the optical transmitter 304. Provided it is able to transmit targeted visible light, it may be integrated as part of the stove guard's user interface. Below the stove guard is typically a rather large and flat surface, which includes the upper surface of the cooker as well as the worktop or the like surrounding it. Targeted visible light can be used to reflect on that surface instructional texts, patterns, and other light phenomena visible to the user.

The stove guard or at least the heat sensor arrangement thereof (and/or other sensor arrangement) may be an integral part of the extractor fan. The parts of the stove guard that would be integrated into the extractor fan may be built to the same size and shape as the light module that would be used in an extractor fan not equipped with a stove guard, for illuminating the cooker and/or its vicinity. This arrangement provides manufacturing advantages, as the manufacturer of the extractor fans can use all the other same parts during the assembly stage, regardless of whether the extractor fan is mounted with an integrated stove guard or a conventional light module. The integratable stove guard may be installed already upon assembly of the extractor fan or may be replaced afterwards in place of a previously installed light module. The integrated stove guard itself may also have light sources, so that the lighting of the stove and the surrounding area does not depend on whether the extractor fan at that location has a simple light module or an integrated stove guard.

If the stove guard arrangement includes a wireless network interface, for example in the form of a so-called radio module, it can advantageously be made so that it is easily and quickly replaced by another one. This provides the advantage that the manufacturer of the stove guard arrangement does not necessarily need to know which wireless communication solution will be used in the environment where the stove guard arrangement eventually will be installed. In order for the radio module to be easily interchangeable, it may at least have a standard size and shape and a standard electrical and functional interface to another stove guard arrangement. A plurality of interchangeable radio modules may be supplied with one and same stove guard arrangement, or the user purchasing the stove guard arrangement may at the time of purchase indicate which radio module his/her stove guard arrangement should be equipped with.

A stove guard with a wired or wireless data transmission connection to a local data transmission network is advantageously constructed so that it has a software which can be automatically upgraded by sending a new software with saving and deploying command via a communication network (so-called Firmware Over the Air). This greatly improves the user convenience since the stove guard may be provided with new functional features, and any deficiencies possibly detected in its operation can be corrected even without the user knowing about the fact or at least without the user having to do anything for updating the software.

What is claimed is:

1. A stove guard comprising:
   a data processing unit and a heat sensor arrangement for receiving heat radiation from objects located in a given field of view and for delivering detector signals indicative of the received heat radiation to the data processing unit, wherein:
   the heat sensor arrangement is arranged to generate detector signals differently corresponding to heat radiation received from a central area of the field of view than to heat radiation received from a circumferential region of the field of view,
   the heat sensor arrangement has at least a first and a second different detector elements,
   the stove guard has a first optical element and a second optical element different from said first optical element, of which said first optical element is arranged to direct heat radiation to the first detector element from a first portion of said field of view and the second optical element is arranged to direct heat radiation to the second detector element from a second portion of said field of view, of which said first portion is narrower than said second portion,
   the stove guard further comprises an optical transmitter arranged to emit optical radiation out of said stove guard so that said heat sensor arrangement is also arranged to receive from the field of view radiation emitted by said optical transmitter and reflected or scattered from an object in the field of view, and
   said data processing unit is programmed to identify whether the received radiation, emitted by the optical transmitter and reflected or scattered from an object in the field of view, changes regularly or irregularly and to interpret regular change as movement of user and irregular change as smoke or steam present in the field of view.

2. The stove guard according to claim 1, wherein at least one of said first and second optical elements comprises a lens disposed on an optical path between objects located in said field of view and the respective detector element included in the heat sensor arrangement, said lens causing an attenuation to heat radiation which is dependent on an arrival angle of the heat radiation.

3. The stove guard according to claim 2, wherein said lens is a Fresnel lens.

4. The stove guard according to claim 1, wherein said data processing unit is programmed to compare the detector signals generated by said first and second detector elements to determine whether a temperature measured by the first detector element is different from that measured by the second detector element.

5. The stove guard according to claim 4, wherein said data processing unit is programmed to provide an alarm in response to an observation according to which the temperature of the object measured by the first detector element is significantly different from that measured by the second detector element and the temperature of the object measured by either one of the detector elements is higher than a predetermined threshold value.

6. The stove guard according to claim 1, wherein:
   the stove guard has a humidity sensor arranged to measure air humidity and to deliver measurement data corresponding to the measured air humidity to said data processing unit;
   said data processing unit is programmed to identify whether a detected irregular change in the radiation emitted by the optical transmitter and reflected from an object in the field of view occurs simultaneously with measured rapid changes in air humidity; and
   said data processing unit is programmed to give a smoke alarm in response to an observation according to which an identified, irregular change in radiation emitted by the optical transmitter and reflected from an object in the field of view does not occur simultaneously with measured rapid changes of air humidity.

7. The stove guard according to claim 1, wherein:
   the stove guard has a proximity sensor arranged to measure the proximity of an external object and to deliver object information corresponding to the measured proximity of the external object to said data processing unit;
   said data processing unit is programmed to identify whether the detected change in the radiation emitted by the optical transmitter and reflected from an external object in the field of view occurs simultaneously with measured proximity of the external object; and
   said data processing unit is programmed to give an alarm in response to an observation that the detected change in the radiation emitted by the optical transmitter and reflected from the external object in the field of view does not occur simultaneously with measured proximity of the external object.

8. The stove guard according to claim 1, wherein:
   the heat sensor arrangement has two or more detector elements having sensitivity bands located at different points of the heat radiation wavelength axis and
   said data processing unit is programmed to compare detector signals generated by different detector elements to determine the temperature of an object in the field of view.

9. The stove guard in accordance with claim 8, wherein at least two of said two or more detector elements are based on different detection technologies.

* * * * *